Sept. 13, 1966   E. R. HOOLEY   3,271,815
POULTRY HEAD REMOVER
Filed July 10, 1964   2 Sheets-Sheet 1

E. RAY HOOLEY
INVENTOR.

BY James L. Girnau
ATT'Y

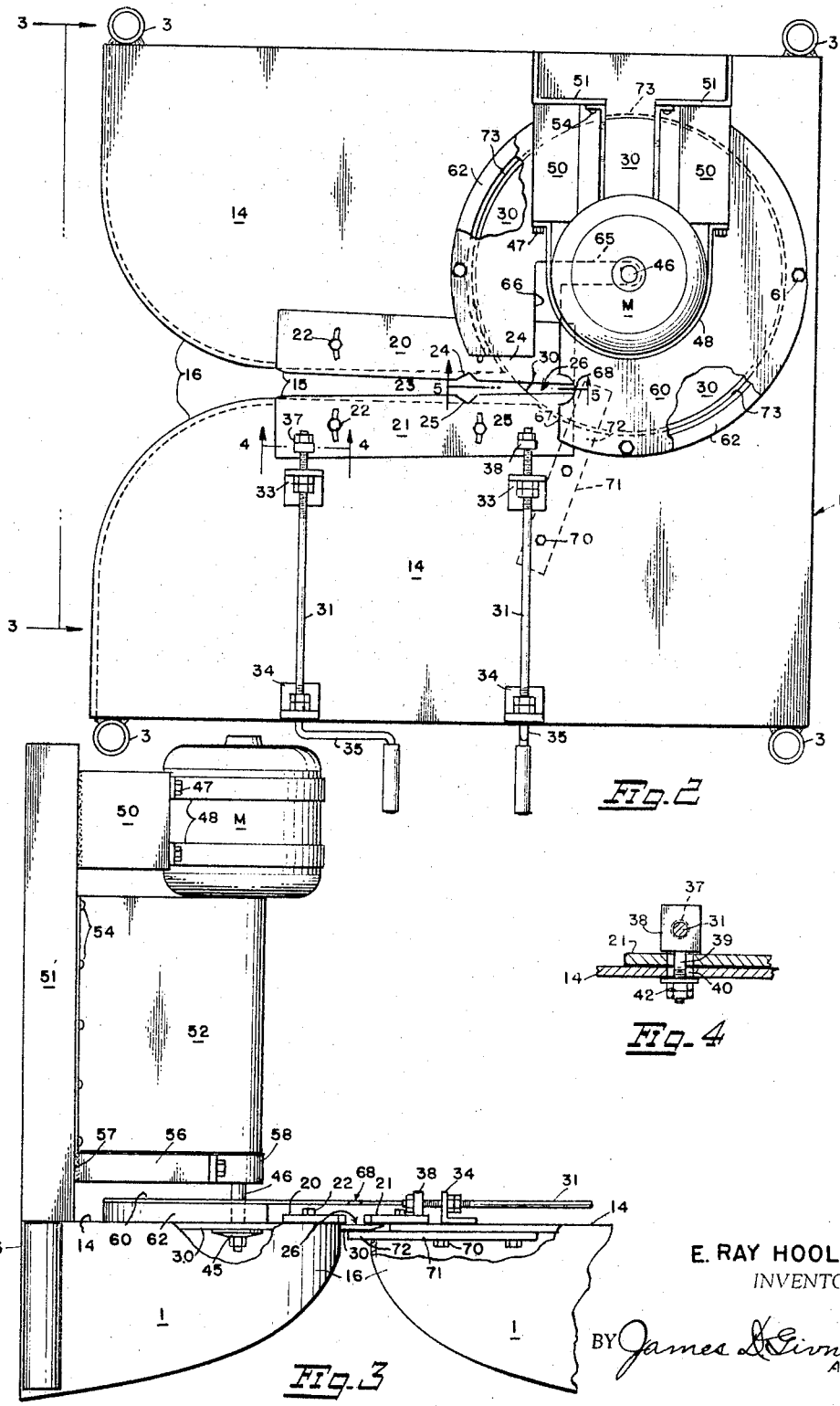

3,271,815
POULTRY HEAD REMOVER
Eldon Ray Hooley, P.O. Box 246, Creswell, Oreg.
Filed July 10, 1964, Ser. No. 381,795
1 Claim. (Cl. 17—12)

This invention relates to poultry decapitators of the type wherein birds are suspended by the legs in wire loops from a conveyor chain and thereby advanced to the decapitating instrumentality of this invention after they have passed through a suitable scalding and defeathering machine by the same or some other conveyor.

It is the principal object of the present invention to provide an arrangement of the character described which is positively effective in properly disjoining the head of the bird and in severing the same at the base of the skull in such a manner as to salvage edible portions of the poultry which were heretofore discarded with the head.

It is to be understood that the term "poultry" and "fowl" as used herein includes chickens, turkeys, ducks, pheasants, guineas, and all other forms of fowl used as food for human consumption.

Another object of the invention is the provision of apparatus which is automatic in its operation.

Another object is the provision of a method for removing the heads of poultry with a minimum of waste of edible parts thereof.

A particular advantage of the present invention is the uniformity with which the heads are detached in contrast to such detachment as heretofore done by a workman at a station for this purpose and wherein an understandable variation in the removal of the heads occurred in the processing.

The foregoing and other objects and advantages which will become subsequently apparent reside in the details of construction and operation as more fully hereinafter described and claimed, reference being had to the accompanying drawings forming a part hereof and in which:

FIGURE 2 is a top plan view with parts broken away of the apparatus with the conveyor removed.

Figure 5:
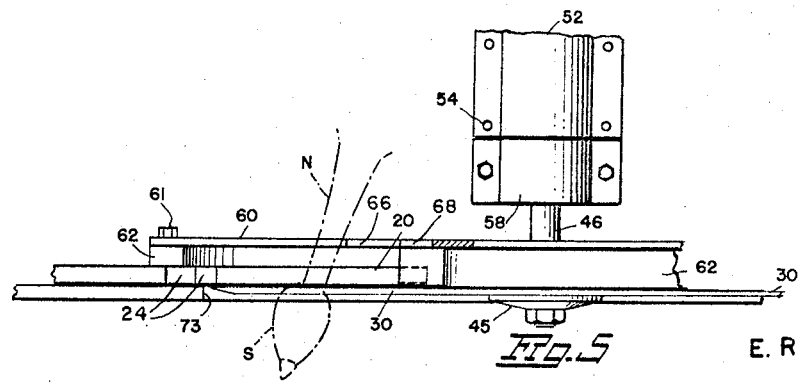

FIGURE 3 is a fragmentary end elevational view with parts broken away taken approximately along the line 3—3 of FIGURE 2, and FIGURES 4 and 5 are sectional detail views on an enlarged scale taken approximately along the lines 4—4 and 5—5 of FIGURE 2.

With continuing reference to the drawings wherein like reference characters designate like parts, reference numeral 1 indicates generally a horizontal table that may be supported for vertical adjustment by legs 2 through the medium of collars 3 welded to the four corners of the table and provided with set screws 4 for locking the table at a desired elevation. The legs could be inserted downwardly into the collars 3 and locked thereto by the set screws 4 for suspending the table from the ceiling of a room or other structure if desired.

In either case the table is stationed below an endless conveyor chain 6 entrained over driving and driven sprockets (not shown) in a conventional manner. The chain 6 is suspended by hangers 7 whose top ends are provided with rollers 8 movable along an endless track 10. Suspended from the conveyor chain 6 by chains 12 are wire shackles 13 especially designed to frictionally or wedgingly engage the legs of poultry to hold them in an inverted position, as shown, for progressive advancement through the apparatus for the decapitating operation.

The table top 14, as best illustrated in FIGURE 2, is slotted inwardly as at 15 from the left hand side where the end wall of the table is divided and curved inwardly as at 16 to provide an entrance for guiding the necks of the poultry to the point of decapitation as will be more fully hereinafter described.

Opposing plates 20 and 21 are adjustably mounted as at 22 to the table top adjacent the slot 15 to provide a progressively narrowing passageway 23 leading into cooperating notches 24 and 25 which open into a continuation 26 of the passageway 23 above a circular cutting knife 30. The opposing inner edges of these plates 20–21, as clearly shown in FIG. 2, are smooth surfaced throughout their length except for the notches 24–25. The intermediate disposition of the notches relative to the ends of the plates 20–21 is such that it divides the passageway 23 into a first zone subjecting an entering bird's neck to gradually increasing horizontal restraint as it is drawn toward the notches, and a second zone from the notches to the cutter knife 30, subjecting the bird's neck to increased tension. The amount of tension imparted to the neck by the pull of the conveyor against the sliding retardation of the neck through the first zone will not break or disjoint the neck since the tension is just enough to pull the skull gradually upward toward and into sliding contact with the underside of the plates until the skull reaches the notches where the tension is momentarily released to position the skull for firm sliding engagement with the plates while the neck is being drawn through the second zone and into the cutting knife so that decapitation will occur precisely at the base of the skull without wasting any part of the meat or skin of the neck.

The plate 21 is adjustable toward and away from the plate 20 by means of rods 31 rotatably mounted and extending through angle clips 33 at their inner ends, 34 at their outer ends and therebeyond provided with crank arms 35. The innermost ends of the rods 31 (see FIGURE 4) are secured as at 37 to lugs 38 each provided with a stem 39 extending downwardly through matching slots 40 in the plate 21 and the table top 14 and provided at its bottom end with a pair of lock nuts 42. In adjusting either or both ends of the plate 21 by rotation of the rods 31 the slots 40 will prevent binding by allowing movement of the stems 39 within the slots.

The cutting knife 30 is secured as at 45 (see FIGURE 3) to the bottom end of a vertical shaft 46 driven by a motor M mounted as at 47 by straps 48 to horizontal blocks 50 welded or otherwise secured to the top end of a pair of angle sections 51 welded or otherwise secured at their bottom end to the table top 14 at one side thereof. A wrap around guard or shield 52 encases the motor shaft 46 and is secured as at 54 to the angle sections 51. Subjacent the shield 52 is a bracket 56 welded at its inner end as at 57 to the angle sections and provided at its outer end with a bearing block 58 through which the lower end of the motor shaft 46 is journaled.

A guard for the cutting knife 30, in the form of a circular plate 60, is mounted upon a supporting ring 62 by bolts 61 which also secure the ring to the tabe top 14 (see FIG. 2). The plate 60 is slotted as at 65 and 66 to accommodate the motor shaft 46 and has a segment cut away to provide an edge 67 notched as at 68 transversely of the table slot 15 and the inner end of the passageway 23. Adjacent the notch 68 and secured as at 70 to the underside of the table top is a plate 71 having one end 72 underlying the peripheral margin of the cutting knife.

As shown in FIGURE 2, the guard-supporting ring 62 surrounds a circular opening 73 in the table top 14 which accommodates the circular cutting knife whose cutting edge is flush with the table top and passes under the plates 20–21 with minimal clearance to effect a clean cutting operation and to prevent dragging of any residual head or flesh particles between the cutting knife, plate 21, and/or the table top 14. The plate 71 stabilizes the knife by its end portion 72 extending under the periphery of the knife and also prevents the severed head from being pulled along by the cutting knife in its rotary motion after the cutting operation.

Figure 1:
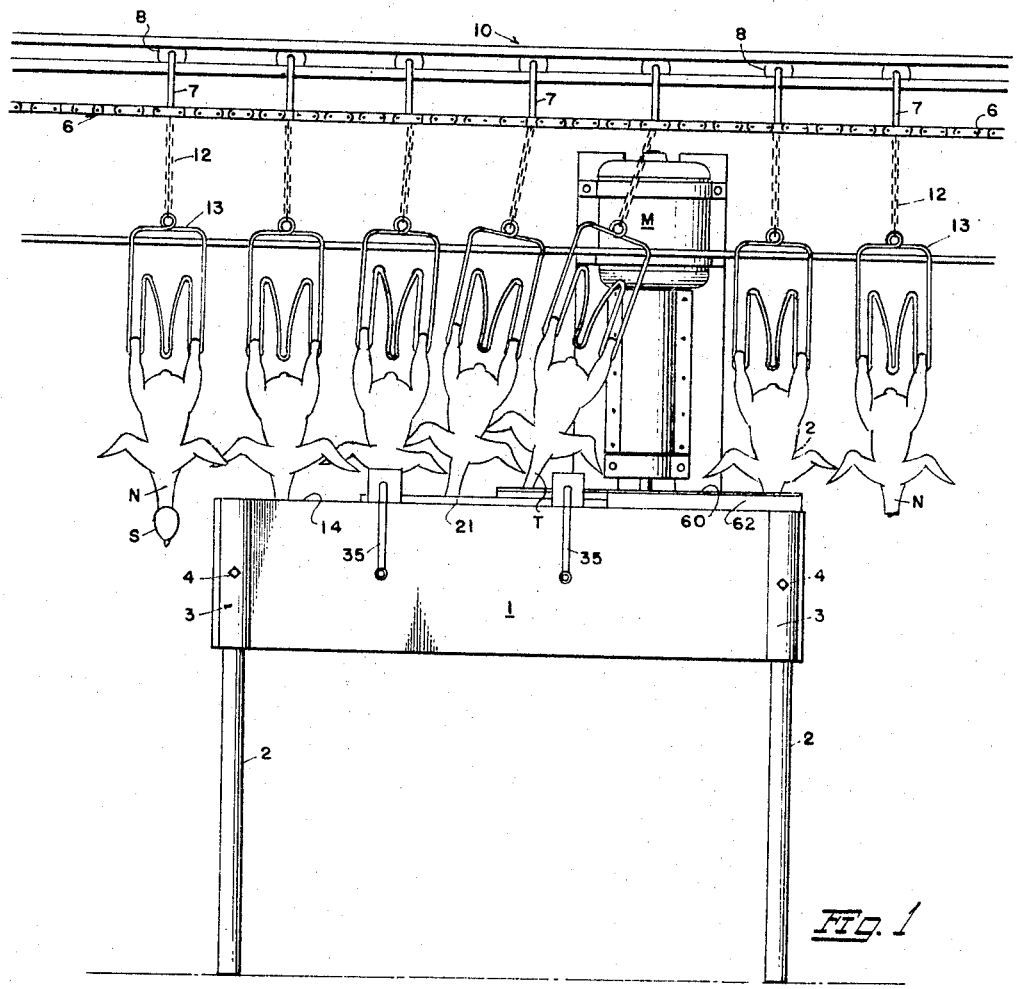
FIGURE 1 is a front elevational view of the invention and a fragment of an endless conveyor for progressively passing poultry through the apparatus for the decapitating operation.

As shown in FIGURE 1, the fowls are suspended from and pulled along by the conveyor chain 6 in an inverted position as they progressively enter the table slot 15 from the left and advance therealong through the gradually narrowing passageway 23 between the plates 20-21. During such passage the necks N are subjected to gradually increasing horizontal restraint until released when the neck enters the cooperating notches 24-25. Such release allows the skull S to be pulled upwardly into firm engagement with the underside of the plates 20-21 and so held in sliding contact therewith by the overall tension applied to the fowl. When the point T of maximum tension is reached by the continuing pull of the conveyor chain 6, chain 12 and shackle 13, severance of the head occurs at the base of the skull without any waste of meat or skin of the neck. The severed head then drops into any suitable subjacent sluiceway or the like (not shown) for conveyance to a point of disposal. The decapitated fowl now released from all tension gravitates to a vertically suspended position as it is moved away from the machine as shown on the right hand side of FIGURE 1.

As previously stated the plate 71 stabilizes the rotary knife 30 and prevents the severed head and/or any residual particles from being pulled along by the saw during its rotation.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

In a poultry processing machine for severing the head of a bird from its neck at the base of the skull while the neck is in longitudinal tension as the bird is advanced along a rectilinear path of travel suspended from a conveyor, the improvement comprising:

a horizontally disposed table top having a forward end and rearward end, a horizontally disposed power driven cutting knife rotatably mounted relative to the table top and having a cutting edge on the same horizontal plane as the table top, said table top having a slot extending from its forward end toward its rearward end, a pair of opposing flat plates mounted upon the table top in angular spaced relation to each other to provide a passageway converging toward the rearward end of the table top with the rearward end of the plates terminating in overlapping relation to said cutting knife with minimal clearance therebetween, the opposing edges of said plates being smooth surfaced throughout their length having a pair of opposing notches intermediate their ends and thereat dividing said converging passageway into a first zone and second zone, whereby the neck of a bird being dealt with will be put in gradually increasing tension as it is drawn uninterruptedly through the convergence of said first zone upwardly toward and into sliding contact with the underside of said plates until the skull reaches said notches where the neck tension is momentarily released to position the skull for firm sliding engagement with the underside of the plates with the neck in greater tension in being drawn through said second zone and into the cutting knife, and whereby decapitation will occur precisely at the base of the skull, a guard for the cutting knife superimposed upon said table top and having a notch therein superjacent the converged ends of said plates to resist movement of the neck out of said converged ends of the plates, and a stabilizing plate for said cutting knife secured to the underside of said table top with one end thereof in underlying contact with the cutting knife whereby to prevent dragging of any residual skull, neck or flesh particles between the cutting knife and the table top beyond said converging ends of said plates.

References Cited by the Examiner
UNITED STATES PATENTS

| | | | |
|---|---|---|---|
| 2,846,718 | 8/1958 | Sengelaub et al. | 17—11 |
| 2,924,846 | 2/1960 | Zebarth | 17—12 |
| 2,926,383 | 3/1960 | Steck | 17—11 |
| 3,017,660 | 1/1962 | Reeves | 17—12 |

SAMUEL KORN, *Primary Examiner.*

LUCIE H. LAUDENSLAGER, *Assistant Examiner.*